W. W. ALBRO.
Vapor Stove.
No. 14,340.
Patented March 4, 1856.
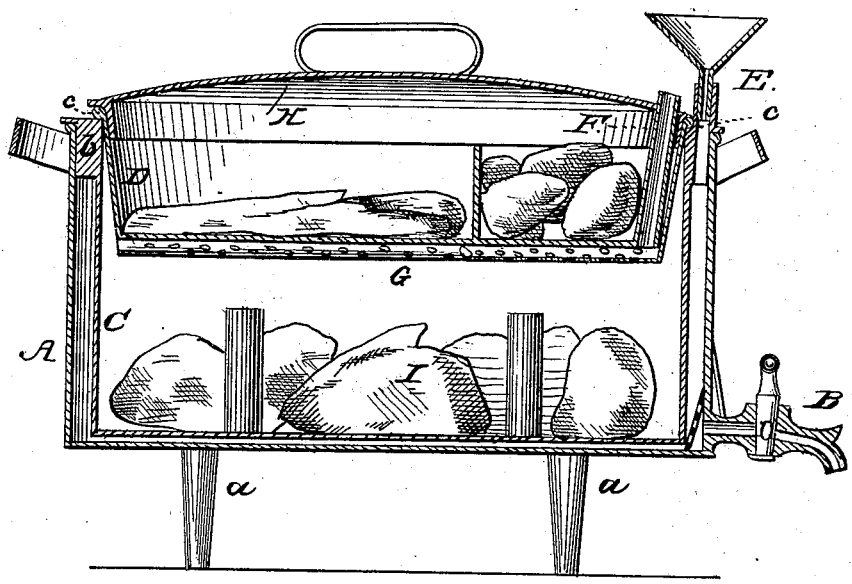

UNITED STATES PATENT OFFICE.

W. W. ALBRO, OF BINGHAMTON, NEW YORK.

IMPROVED APPARATUS FOR COOKING WITH QUICKLIME.

Specification forming part of Letters Patent No. 14,340, dated March 4, 1856.

*To all whom it may concern:*

Be it known that I, W. W. ALBRO, of Binghamton, in the county of Broome and State of New York, have invented a new and Improved Apparatus or Device for Cooking with Quicklime; and I do hereby declare that the following is a full, clear, and exact description of the same, reference being had to the annexed drawing, making a part of this specification, said drawing being a longitudinal vertical section of my improvement.

My invention consists in the peculiar construction of the implement or apparatus, as will be presently shown and described.

A represents a water-tight vessel, which may be constructed of sheet metal and of oval or other desired form. The vessel A rets upon feet $a$, and has a faucet B at the lower part of one end.

C represents a vessel which is fitted within the vessel A, a space being allowed between the two vessels at their sides and bottoms. The vessel C has a flange $b$ around its upper edge, which flange closes over or fills the upper part of the space between the two vessels A C.

D represents a dish or vessel which is fitted within the vessel C. This dish or vessel has a flange $c$ around its upper edge, which flange rests upon the upper edge of the vessel C.

E is a tube which communicates with the space between the two vessels A C, and F is a tube which passes through the bottom of the dish or vessel D at one end and communicates with a perforated tube G underneath the dish or vessel D, as plainly shown in the drawing. The dish or vessel D is quite shallow compared with the vessel C, and considerable height is consequently allowed between the bottom of the vessel C and the bottom of the dish or vessel D.

H is a cover which is fitted over the dish or vessel D.

The implement is used as follows: Coffee or tea is made in the space between the two vessels A C. Meat and vegetables are placed within the dish or vessel D, which may be provided with partitions to separate the different articles. A requisite quantity of quicklime I is placed within the vessel C, and the cover H is placed over the dish or vessel D. A requisite quantity of water is then poured into the tube F, which water falls through the perforated tube G in a shower upon the quicklime I, and the heat evolved by the slaking of the lime cooks the articles in the dish D and boils the tea or coffee between the two vessels A C.

The within-described apparatus may be made of any desired size, so as to cook in large or small quantities. It is an economical device requiring but a small quantity of lime. One pint will suffice for cooking a meal for one person.

Having thus described my invention, what I claim as new, and desire to secure by Letters Patent, is—

The apparatus or device formed of the vessels A C D, constructed or arranged substantially as shown and described, for the purpose specified.

W. W. ALBRO.

Witnesses:
T. G. NEGUS,
R. C. NEGUS.